(12) United States Patent
Nishimura

(10) Patent No.: US 11,595,844 B2
(45) Date of Patent: Feb. 28, 2023

(54) PLANT SYSTEM AND METHOD

(71) Applicant: YOKOGAWA ELECTRIC CORPORATION, Tokyo (JP)

(72) Inventor: Hideo Nishimura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 130 days.

(21) Appl. No.: 17/062,646

(22) Filed: Oct. 5, 2020

(65) Prior Publication Data

US 2021/0136621 A1 May 6, 2021

(30) Foreign Application Priority Data

Oct. 30, 2019 (JP) .............................. JP2019-197269

(51) Int. Cl.
*H04W 76/10* (2018.01)
*H04W 28/02* (2009.01)
*G05B 19/4155* (2006.01)
*H04L 67/12* (2022.01)

(52) U.S. Cl.
CPC ............... *H04W 28/0268* (2013.01); *G05B 19/4155* (2013.01); *H04W 76/10* (2018.02); *G05B 2219/31372* (2013.01); *H04L 67/12* (2013.01)

(58) Field of Classification Search
CPC ............. H04W 28/0268; H04W 76/10; H04W 4/30; G05B 19/4155; G05B 2219/31372; G05B 19/4185; G05B 2219/33192; G05B 2219/31251; H04L 67/12; H04L 69/40; H04L 69/18; H04L 69/14; Y04S 40/18
See application file for complete search history.

(56) References Cited

U.S. PATENT DOCUMENTS

| | | |
|---|---|---|
| 2008/0148296 A1 | 6/2008 | Chen |
| 2009/0312853 A1 | 12/2009 | Kore |
| 2016/0065656 A1 | 3/2016 | Patin |
| 2016/0173385 A1* | 6/2016 | Isaksson ............... H04L 47/283 370/238 |
| 2016/0261482 A1 | 9/2016 | Mixer |
| 2019/0280896 A1 | 9/2019 | Imamura |

FOREIGN PATENT DOCUMENTS

| | | |
|---|---|---|
| JP | 2007116424 A | 5/2007 |
| JP | 2016163352 A | 9/2016 |
| JP | 2018191129 A | 11/2018 |
| JP | 2019161359 A | 9/2019 |

OTHER PUBLICATIONS

Office Action issued for counterpart Japanese Application No. 2019-197269, issued by the Japanese Patent Office dated Nov. 30, 2021 (drafted on Nov. 19, 2021).
Extended European Search Report for European Patent Application No. 20200098.0, issued by the European Patent Office dated Nov. 24, 2020.

\* cited by examiner

*Primary Examiner* — Mandish K Randhawa

(57) ABSTRACT

A plant system includes: an access node connected to a network; a plurality of controllers configured to perform distributed control on a plurality of field devices provided in a plant; and a wireless communication unit provided in each group of a plurality of groups into which the plurality of controllers are grouped and connected to each controller in the corresponding group via a wired connection, and configured to connect each controller to the access node via a wireless connection.

11 Claims, 5 Drawing Sheets

PLANT SYSTEM AND METHOD

The contents of the following Japanese patent application(s) are incorporated herein by reference: NO. 2019-197269 filed in JP on Oct. 30, 2019

1. TECHNICAL FIELD

The present invention relates to a plant system and a method.

2. RELATED ART

Conventionally, a distributed control system (DCS: Distributed Control System) is known, where it controls an industrial process by use of a plurality of distributed control nodes (DCN: Distributed Control Node) (refer to Patent Document 1, for example).

Patent Document 1: United States Patent Application Publication No. 2016/0065656

Patent Document 1 discloses a plurality of DCNs connected to a higher level system such as respective servers, respectively, via a plurality of switches and routers via a wired connection. However, it is desirable to establish a network in a simplified manner such that a plurality of controllers can communicate with the higher level system.

SUMMARY

In order to solve the problem mentioned above, provided is a plant system in the first aspect of the present invention. The plant system may include an access node connected a network. The plant system may include a plurality of controllers configured to perform distributed control on a plurality of field devices provided in a plant. The plant system may include a wireless communication unit provided in each group of a plurality of groups into which the plurality of controllers are grouped and connected to each controller in the corresponding group via a wired connection, and configured to connect each controller to the access node via a wireless connection.

In the second aspect of the present invention, provided is a method. A method may be applied to: an access node connected to a network; a plurality of controllers configured to perform distributed control on a plurality of field devices provided in a plant; and a wireless communication unit provided in each group of a plurality of groups into which the plurality of controllers are grouped and connected to each controller in the corresponding group via a wired connection, wherein the method may include connecting each controller to the access node via a wireless connection via a wireless communication unit.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through the embodiments of the invention. However, the embodiments described below are not to limit the claimed invention. In addition, all of the combinations of the features described in the embodiments are not necessarily required in the solution of the invention.

Figure 1:
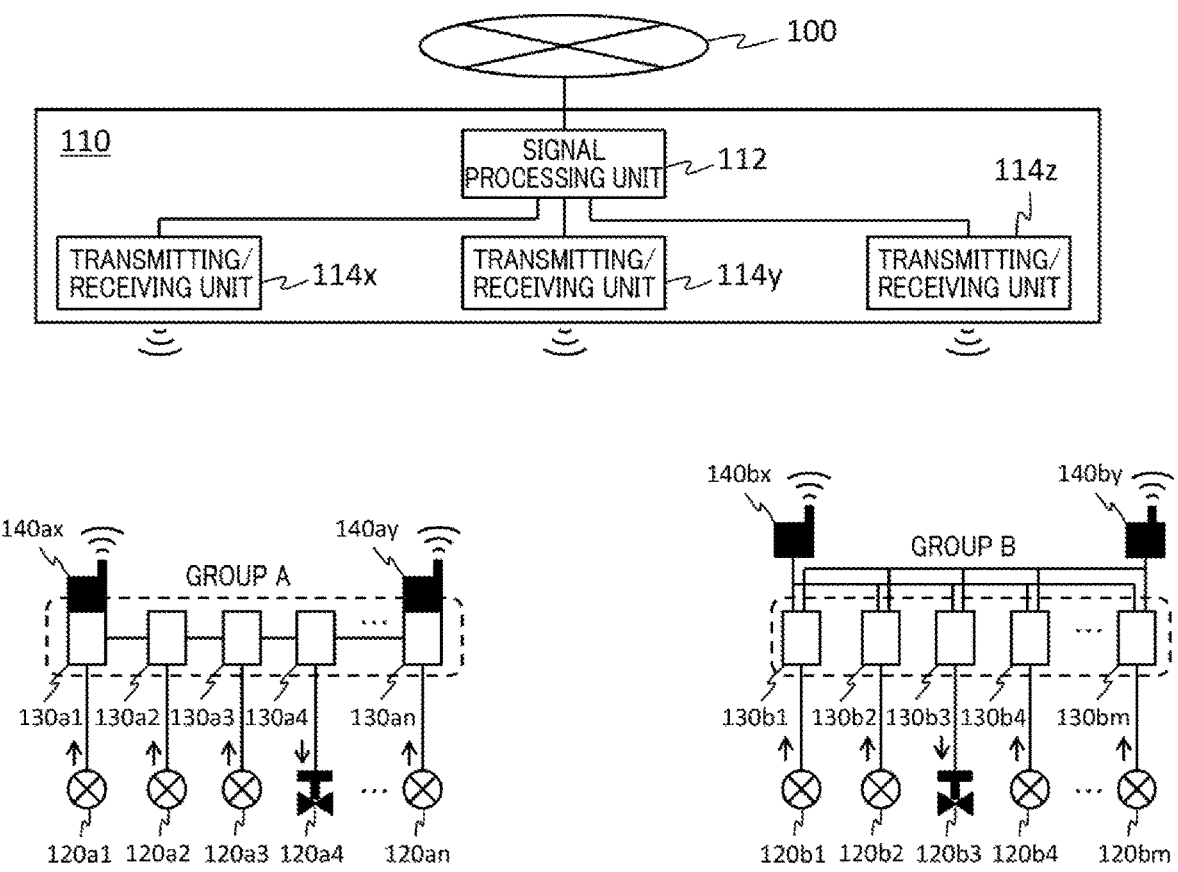
FIG. 1 illustrates a plant system 10 according to the present embodiment.

FIG. 1 illustrates a plant system 10 according to the present embodiment. The plant system 10 performs distributed control on a plurality of field devices provided in a plant by use of a plurality of controllers. Here, in the plant system 10 according to the present embodiment, the plurality of controllers and an access node connected to a network are connected via a wireless connection such that the plurality of controllers can communicate with the network.

In the present embodiment, an example case will be described where the plant system 10 uses the private 5G (fifth generation mobile communication system) as a wireless communication technology. However, it is not limited thereto. The plant system 10 may use other wireless communication technologies different from the private 5G as the wireless communication technology, such as LTE-A, LTE, WiMAX, XGP, HSPA, W-CDMA, CDMA 2000, cdmaOne, PHS, GSM (registered trademark), and PDC.

In addition, the plant to be controlled by the plant system 10 according to the present embodiment may be, for example, an industrial plant such as the chemical industry, a plant which manages and controls a wellhead such as a gas field and an oil field, and its surroundings, a plant which manages and controls power generation such as water power generation, thermal power generation and nuclear power generation, a plant which manages and controls environmental power generation such as solar power generation and wind power generation, and a plant which manages and controls a system such as a water supply and sewerage system and a dam, or other.

The plant system 10 includes a network 100, an access node 110, a field device 120, a controller 130, and a wireless communication unit 140.

The network 100 is a communication network at a higher level than the access node 110. As an example, the network 100 may include a core network and an IP network. The core network is a network configured by a switch and a subscriber information management device, for example. The IP network is a computer network mutually connected by use of the Internet protocol technology. A variety of computers and servers (also referred to as a higher level system) is connected to the IP network The access node 110 is connected to the network 100. More specifically, the access node 110 is connected to the core network, and can communicate with the IP network via the core network. The access node 110 may be a gNB in the local 5G, for example.

The access node 110 includes one signal processing unit 112, a plurality of transmitting/receiving units 114$x$, 114$y$, and 114$z$ (collectively referred to as a transmitting/receiving unit 114). The signal processing unit 112 and each of the plurality of transmitting/receiving units 114 are connected, for example, through an optical interface which supports the CPRI (Common Public Radio Interface) or other. This allows the plant system 10 to connect each controller 130 to the access node 110 via a wireless connection via the plurality of transmitting/receiving units 114 so as to make a wireless communication path redundant. This will be described below. It is noted that, if the wireless communication path is made redundant, at least one of the wireless communication unit 140 and the access node 110 may aggregate redundant data reaching via a plurality of paths into one piece of data. The present figure illustrates an example case where the access node 110 includes three transmitting/receiving units 114x-114z, but is not limited thereto. The access node 110 may also include more than or less than three transmitting/receiving units 114.

The signal processing unit 112 is connected to the plurality of transmitting/receiving units 114 via an optical interface or other. In addition, the signal processing unit 112 is connected to the network 100. More specifically, the signal processing unit 112 is connected to the core network so that it can communicate with the IP network via the core network. The signal processing unit 112 may be, for example, a CU (Central Unit) and a DU (Distributed Unit) in the gNB. As an example, the signal processing unit 112 performs digital baseband signal processing, termination processing on the NG interface used for a connection to the core network, termination processing on the Xn interface used for a connection to the neighboring gNB, call processing, and monitoring control processing. The signal processing unit 112 modulates an IP packet received from the IP network via the core network into a digital baseband signal and supplies it to the plurality of transmitting/receiving units 114. In addition, the signal processing unit 112 demodulates the digital baseband signal supplied from the plurality of transmitting/receiving units 114 and transmits the IP packet to the IP network via the core network.

The transmitting/receiving unit 114 is connected to the signal processing unit 112 via an optical interface or other. The transmitting/receiving unit 114 may be, for example, an RRU (Remote Radio Unit) in the gNB. The transmitting/receiving unit 114 converts a digital baseband signal supplied from the signal processing unit 112 into an RF (Radio Frequency) signal, performs power amplification on the RF signal, and transmits it to the wireless communication unit 140. In addition, the transmitting/receiving unit 114 amplifies the RF signal received from the wireless communication unit 140, converts it into a digital baseband signal and supplies it to the signal processing unit 112.

Here, the plurality of transmitting/receiving units 114x, 114y, and 114z may be provided at different locations in the plant, respectively. Then, coverage areas covered by the plurality of transmitting/receiving units 114x, 114y, and 114z, respectively, may cover the entire plant, or an entire partial zone of the plant. Here, at least a part of the coverage areas covered by the plurality of transmitting/receiving units 114x, 114y, and 114z, respectively, may be overlapped. This allows the plant system 10 to perform, even if a stable line of sight is not obtained between one transmitting/receiving unit 114 and the wireless communication unit 140 constantly or temporarily, a communication with the wireless communication unit 140 by use of another transmitting/receiving unit 114. In addition, the plant system 10 can obtain the diversity effect by use of the plurality of transmitting/receiving units 114 provided at different locations to transmit or receive the same traffic.

The field device 120 may be, for example, a sensor device such as a pressure meter, a flow meter, and a temperature sensor, a valve device such as a flow control valve and an on-off valve, an actuator device such as a fan and a motor, an imaging device such as a still camera and a video camera for imaging a situation and an object in the plant, an audio device such as a microphone and a speaker for collecting a noise or other in the plant and generating an alarm sound or other, and a location detection device for outputting location information of each device, or other. The plant to be controlled by the plant system 10 according to the present embodiment is provided with a plurality of such field devices 120. The present figure illustrates an example case where n field devices 120a1-120an and m field devices 120b1-120bm (collectively referred to as the field device 120) are provided in the plant.

Here, for example, the field device 120a1, 120b1 or other may be a device to output data generated by a device in the plant, such as the sensor device, the imaging device, the audio device, and the location detection device. On the other hand, for example, the field device 120a4, 120b3 or other may be a device such as the valve device and the actuator device to control a part of the plant in accordance with input data.

The controller 130 is connected to the field device 120 to control the field device 120. The plant system 10 according to the present embodiment is provided with a plurality of such controllers 130. Then, the plurality of controllers 130 perform distributed control on a plurality of field devices 120 provided in the plant. The present figure illustrates an example case where the plant system 10 includes n controllers 130a1-130an and m controllers 130b1-130bm (collectively referred to as the controller 130) and one controller 130 is connected to one field device 120 one to one. That is, for example, the controller 130a1 is connected to the field device 120a1 to control the field device 120a1. Similarly, for example, the controller 130b1 is connected to the field device 120b1 to control the field device 120b1. However, this is not limited thereto. For example, one controller may also be connected to several field devices 120 among the plurality of field devices 120 one to many so that one controller controls several field devices 120 among the plurality of field devices 120.

Here, the plurality of controllers 130 are grouped into a plurality of groups. Here, for example, among the plurality of controllers 130, a group of controllers 130 located in the vicinity of one another may form one group. As an example, the present figure illustrates that n controllers 130a1-130an located in the vicinity of one another form a group A and m controllers 130b1-130bm located in the vicinity of one another form a group B. It is noted that the number of groups which divide the plurality of controllers may be determined as appropriate depending on the size of the plant to be controlled, the number of the field devices 120, and the number of the controllers 130, for example.

The wireless communication unit 140 is provided in each group of the plurality of groups into which the plurality of controllers 130 are grouped, is connected to each controller 130 in the corresponding group via a wired connection, and connects each controller 130 to the access node 110 via a wireless connection. In the plant system 10, a plurality of such wireless communication units 140 may be provided in a group. Then, each controller 130 may be connected to all of the plurality of wireless communication units 140 provided in the group via a wired connection. As an example, the group A is provided with wireless communication units 140ax and 140ay (collectively referred to as a wireless communication unit 140a) and each of the controllers 130a1-130an is connected to both of the wireless communication units 140ax and 140ay via a wired connection.

Similarly, the group B is provided with wireless communication units 140*bx* and 140*by* (collectively referred to as a wireless communication unit 140*b*, and in addition, the wireless communication units 140*a* and 140*b* are collectively referred to as the wireless communication unit 140, if they do not need to be distinguished from each other) and each of the controllers 130*b*1-130*bm* is connected to both of the wireless communication units 140*bx* and 140*by* via a wired connection. This can connect each controller 130 to the access node 110 via a wireless connection via the plurality of wireless communication units 140 so as to make a wireless communication path redundant. This will be described below. It is noted that, if the wireless communication path is made redundant, at least one of the wireless communication unit 140 and the access node 110 may aggregate redundant data reaching via a plurality of paths into one piece of data.

Here, the plurality of wireless communication units 140 may be provided at different locations in a group, respectively. That is, in the group A, the wireless communication unit 140*ax* and the wireless communication unit 140*ay* may be provided at different locations, respectively. Similarly, in the group B, the wireless communication unit 140*bx* and the wireless communication unit 140*by* may be provided at different locations, respectively. This allows the plant system 10 to perform, even if a stable line of sight is not obtained between one wireless communication unit 140 and the access node 110 constantly or temporarily, a communication with the access node 110 by use of another wireless communication unit 140. In addition, the plant system 10 can obtain the diversity effect by use of the plurality of wireless communication units 140 provided at different locations to transmit or receive the same traffic.

Here, so as to connect the wireless communication unit 140 to each controller 130 in the corresponding group via a wired connection, the wireless communication unit 140 may be indirectly connected to each controller 130 via a wired connection. That is, as illustrated in the group A, the controllers 130*a*1-130*an* may be connected in series via a wired connection such that the wireless communication units 140*ax* and 140*ay* are connected to each of the controllers 130*a*1-130*an* via a wired connection via one or more controllers 130. In this case, each controller 130 may relay a traffic received from a controller 130 located at a lower level on the network to a controller 130 located at a higher level on the network. This can shorten the wiring length to connect the wireless communication units 140*ax* and 140*ay* to each of the controllers 130*a*1-130*an* via a wired connection, thereby simplifying the cabling. Alternatively, as illustrated in the group B, the wireless communication units 140*bx* and 140*by* may be directly connected to each of the controllers 130*b*1-130*bm* via a wired connection. This can omit control on another controller 130 to relay a communication between the wireless communication units 140*bx* and 140*by* and each of the controllers 130*b*1-130*bm*.

Such plant system 10 enables a variety of traffics to be transmitted between each controller 130 and the higher level system and among the controllers 130. For example, a communication is performed from each controller 130 to the higher level system for IIoT data analysis. In such a communication for IIoT data analysis, the traffic transmitted requires a large amount of data, but is not required to have substantially a high reliability or real-time property in general. In addition, a communication for asset management is performed between each controller 130 and the higher level system. In such a communication for asset management, the traffic transmitted may be intermittent, but requires a certain degree of reliability in general. In addition, for example, if the actuator is controlled in accordance with data from a sensor, or in other cases, a communication for closed-loop control is performed among the controllers 130. In such a communication for closed-loop control, the traffic transmitted requires a less amount of data, but is required to have a high reachability and real-time property in general. The plant system 10 according to the present embodiment transmits such a huge variety of traffics, respectively, so as to meet the required conditions.

Figure 2:
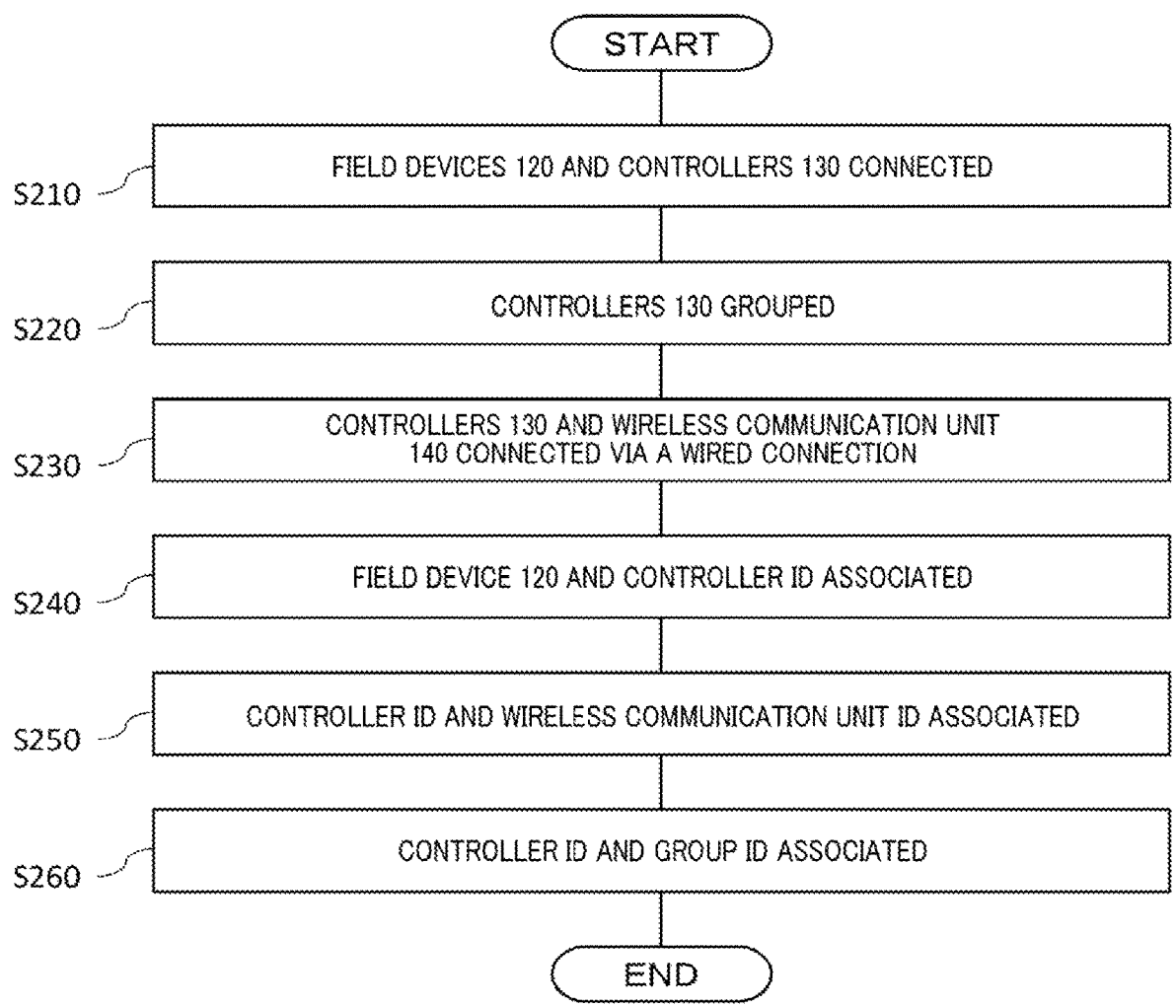
FIG. 2 illustrates an example flow of an initial setting of the plant system 10 according to the present embodiment.

FIG. 2 illustrates an example flow of an initial setting of the plant system 10 according to the present embodiment. In the step 210, for example, an operator connects the plurality of field devices 120 provided in the plant to the plurality of controllers 130 via a wired connection. As an example, the operator connects the plurality of field devices 120*a*1-120*an* and 120*b*1-120*bm* to the plurality of controllers 130*a*1-130*an* and 130*b*1-130*bm* one to one.

In the step 220, for example, the operator groups the plurality of controllers 130 into a plurality of groups. Here, the operator configures, for example, a group of controllers 130 located in the vicinity of one another to form one group. As an example, the operator configures n controllers 130*a*1-130*an* located in the vicinity of one another to form a group A and configures m controllers 130*b*1-130*bm* located in the vicinity of one another to form a group B.

In the step 230, for example, the operator connects each controller 130 in the group grouped in the step 220 to the wireless communication unit 140 via a wired connection. Here, the operator connects, for example, the controllers 130*a*1-130*an* which belong to the group A in series via a wired connection. In addition, the operator connects the controller 130*a*1 located at one end of the group A to the wireless communication unit 140*ax* integrally. Similarly, the operator connects the controller 130*an* located at the other end of the group A to the wireless communication unit 140*ay* integrally. In addition, the operator connects each of the controllers 130*b*1-130*bm* which belong to the group B to the wireless communication unit 140*bx* located at one end of the group B via a wired connection. Similarly, the operator connects each of the controllers 130*b*1-130*bm* which belong to the group B to the wireless communication unit 140*by* located at the other end of the group B via a wired connection.

In the step 240, for example, the operator accesses a server on the IP network and associates each field device 120 with each controller ID for identifying the controller 130 connected to each field device 120.

In the step 250, for example, the operator accesses the same server and associates each controller ID with each wireless communication unit ID for identifying the wireless communication unit 140. Here, if the plurality of wireless communication units 140 are provided in the group, for example, the operator determines a wireless communication unit 140 closest to each controller 130 to be primarily used for a connection to the access node 110 and associates the ID of said wireless communication unit 140 with each controller ID.

In the step 260, for example, the operator associates each controller ID with each group ID for identifying the group, based on the grouping in the step 220. It is noted that, if each controller ID and each group ID are associated with each other, the plant system 10 may broadcast to the plurality of controllers 130 which belong to the same group, based on said association. For example, if the access node 110 receives a traffic from an application server to the group A, it may broadcast said traffic to the plurality of controllers 130a1-130an which belong to the group A, based on said association. This allows, for example, a server on the IP network to store a mapping table which indicates a controller 130 to which a field device 120 is connected, a group to which a controller 130 belongs to, and a wireless communication unit 140 to be primarily used for a connection to the access node 110. Such a mapping table may be stored in a server on the IP network such that at least any of the wireless communication unit 140 and the access node 110 accesses said server as appropriate to refer to the mapping table. Alternatively, or in addition, at least any of the wireless communication unit 140 and the access node 110 may obtain and store a part or all of the mapping table from said server and refer to the mapping table stored therein.

Figure 3:
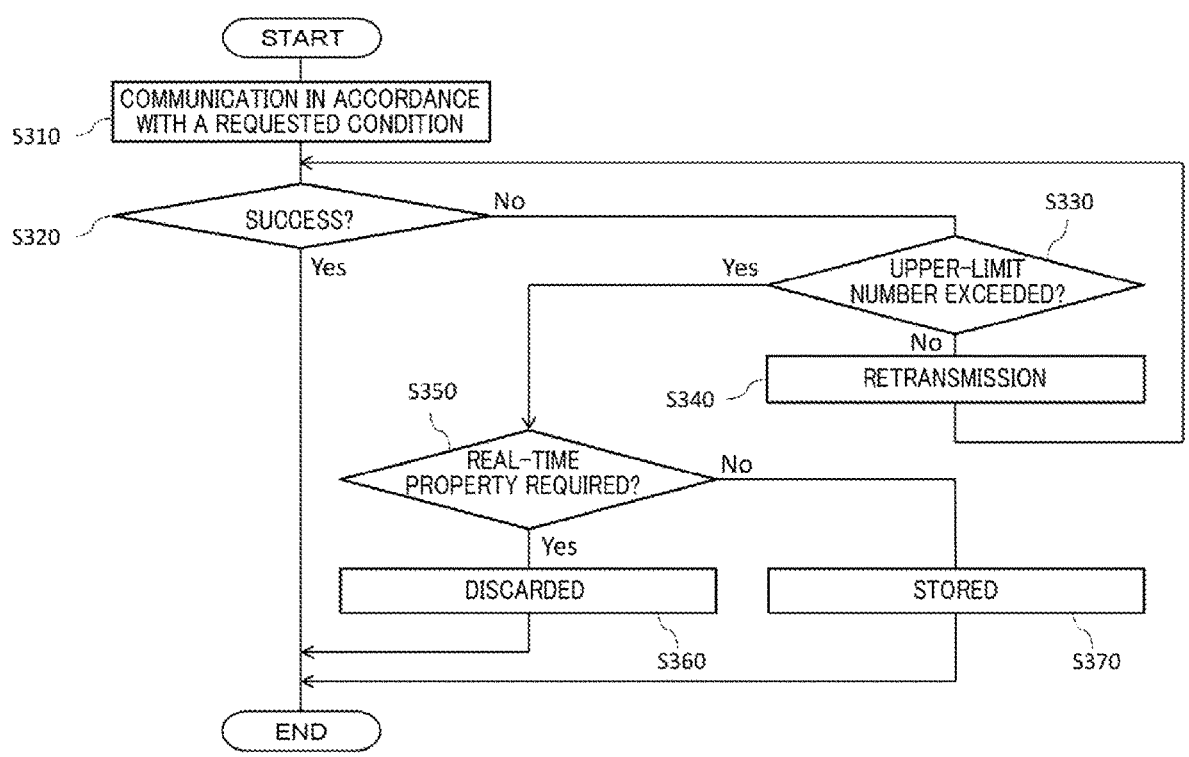
FIG. 3 illustrates an example flow of performing a wireless communication by use of the plant system 10 according to the present embodiment.

FIG. 3 illustrates an example flow of performing a wireless communication by use of the plant system 10 according to the present embodiment. In the step 310, the controller 130 and the access node 110 start a communication in accordance with a requested condition. For example, when the access node 110 receives a request for transmitting a traffic from the higher level system or each controller 130, it checks the requested condition of the traffic to be transmitted.

Then, the access node 110 performs priority control on a traffic in accordance with the requested condition and assigns a wireless resource used to transmit the traffic between the access node 110 and each controller 130. For example, if a plurality of traffics are to be transmitted, the access node 110 assigns a wireless resource primarily to a traffic which is required to have a real-time property.

In addition, the access node 110 sets the upper-limit number of transmissions for each traffic in accordance with the requested condition. For example, the access node 110 sets the relatively larger upper-limit number for a traffic which requires high reachability.

In addition, the access node 110 sets a transmission path for each traffic in accordance with the requested condition. For example, the access node 110 sets a plurality of paths for a traffic which requires high reliability such that the wireless communication path is made redundant.

The access node 110 notifies information such as the determined assignment of the wireless resource, upper-limit number, and transmission path to the wireless communication unit 140. Then, the wireless communication unit 140 and the access node 110 perform a communication in accordance with said information. In this manner, the access node 110 performs QoS (Quality of Service) control over the wireless access network in accordance with the requirement for a communication with each controller 130.

It is noted that, in said communication, the wireless communication unit 140 and the access node 110 may identify the destination of the traffic with reference to the mapping table mentioned above, for example. That is, the wireless communication unit 140 may refer to a controller ID for identifying each controller 130 in the corresponding group, and transmit a traffic to each controller 130 based on said controller ID. In addition, the access node 110 may be configured to refer to association between a controller ID for identifying each controller 130 and a wireless communication unit ID for identifying the wireless communication unit 140 used by each controller 130 for a connection to the access node 110, and transmit a traffic to each controller 130, to the corresponding wireless communication unit 140 based on said controller ID and said wireless communication unit ID.

As an example, in the plant system 10, it is assumed that a request is received from an application server on the IP network, for collecting sensor data of the field device 120a2 for IIoT analysis. In this case, the access node 110 obtains said request via the core network. Then, the access node 110 refers to the mapping table and identifies that the field device 120a2 included in said request is connected to the controller 130a2. In addition, the access node 110 refers to the mapping table and identifies that the controller 130a2 belongs to the group A and primarily uses the wireless communication unit 140ax for a connection to the access node 110. This enables the access node 110 to request the controller 130a2 via the transmitting/receiving unit 114x, the wireless communication unit 140ax, and the controller 130a1, for sensor data of the field device 120a2. Then, the controller 130a2 obtains the sensor data from the field device 120a2 and transmits it to the access node 110 via the controller 130a1, the wireless communication unit 140ax, and the transmitting/receiving unit 114x. This enables the access node 110 to transmit the sensor data of the field device 120a2 to the application server on the IP network via the core network.

As another example, in the plant system 10, it is assumed that a communication request for asset management of the field device 120b2 is received from an application server on the IP network. In this case, the access node 110 obtains said request via the core network. Then, the access node 110 refers to the mapping table and identifies that the field device 120b2 included in said request is connected to the controller 130b2. In addition, the access node 110 refers to the mapping table and identifies that the controller 130b2 belongs to the group B and primarily uses the wireless communication unit 140bx for a connection to the access node 110. This enables the access node 110 to request the controller 130b2, via the transmitting/receiving unit 114z and the wireless communication unit 140bx, for a communication for asset management of the field device 120b2. In addition, the access node 110 requests the controller 130b2, via the transmitting/receiving unit 114y and the wireless communication unit 140bx, for a communication for asset management of the field device 120b2. Furthermore, the access node 110 requests the controller 130b2, via the transmitting/receiving unit 114z and the wireless communication unit 140by, for a communication for asset management of the field device 120b2. Then, the controller 130b2 obtains data for asset management from the field device 120b2, and transmits it to the access node 110 via the wireless communication unit 140bx and the transmitting/receiving unit 114z. In addition, the controller 130b2 transmits the data for asset management from the field device 120b2 to the access node 110 via the wireless communication unit 140bx and the transmitting/receiving unit 114y. Furthermore, the controller 130b2 transmits the data for asset management from the field device 120b2 to the access node 110 via the wireless communication unit 140by and the transmitting/receiving unit 114z. Here, if the data reaches via a plurality of paths, the access node 110 aggregates (selects or combines) redundant data reaching via the plurality of paths into one piece of data. Then, the access node 110 transmits the data for asset management of the field device 120b2 to the application server on the IP network via the core network.

In addition, as another example, in the plant system 10, it is assumed that a request is received from an application server on the IP network, for closed-loop control on the field device 120a4 corresponding to an actuator, for example, in accordance with sensor data of the field device 120a3. In this case, the access node 110 obtains said request via the core network. Then, the access node 110 refers to the mapping table and identifies that the field device 120a3 included in said request is connected to the controller 130a3. In addition, the access node 110 refers to the mapping table and identifies that the controller 130*a*3 belongs to the group A and primarily uses the wireless communication unit 140*ax* for a connection to the access node 110. This enables the access node 110 to request the controller 130*a*3 via the transmitting/receiving unit 114*x*, the wireless communication unit 140*ax*, the controller 130*a*1, and the controller 130*a*2, for sensor data of the field device 120*a*3. Then, the controller 130*a*3 obtains the sensor data from the field device 120*a*3 and transmits it to the wireless communication unit 140*ax* via the controller 130*a*2 and the controller 130*a*1. Here, the wireless communication unit 140*ax* refers to the mapping table and identifies that the field device 120*a*4 is connected to the controller 130*a*4. In addition, the wireless communication unit 140*ax* refers to the mapping table and identifies that the controller 130*a*4 belongs to the group A managed by the wireless communication unit 140*ax* per se. This enables the wireless communication unit 140*ax* to transmit the sensor data of the field device 120*a*3 to the controller 130*a*4 via the controller 130*a*1, the controller 130*a*2, and the controller 130*a*3. Then, the controller 130*a*4 controls the field device 120*a*4 corresponding to an actuator, for example, in accordance with the sensor data of the field device 120*a*3. It is noted that a communication between the controller 130*a*3 and the controller 130*a*4 via the wireless communication unit 140*ax* was described as an example in the foregoing, but it is not limited thereto. If the controllers 130 in the same group can directly communicate with one another, for example, the controller 130*a*3 may also transmit the sensor data of the field device 120*a*3 directly to the controller 130*a*4.

In addition, as another example, in the plant system 10, it is assumed that a request is received from an application server on the IP network, for control on the field device 120*b*3 corresponding to a valve, for example, in accordance with a noise sensed by the field device 120*a*1. In this case, the access node 110 refers to the mapping table and identifies that the field device 120*a*1 included in said request is connected to the controller 130*a*1. In addition, the access node 110 refers to the mapping table and identifies that the controller 130*a*1 belongs to the group A and primarily uses the wireless communication unit 140*ax* for a connection to the access node 110. Similarly, the access node 110 refers to the mapping table and identifies that the field device 120*b*3 included in said request is connected to the controller 130*b*3. In addition, the access node 110 refers to the mapping table and identifies that the controller 130*b*3 belongs to the group B and primarily uses the wireless communication unit 140*bx* for a connection to the access node 110. This enables the access node 110 to transmit, to the controller 130*a*1 via the transmitting/receiving unit 114*x* and the wireless communication unit 140*ax*, a request for notifying that the field device 120*a*1 senses a noise. Then, if the field device 120*a*1 senses a noise, the controller 130*a*1 transmits, to the access node 110 via the wireless communication unit 140*ax* and the transmitting/receiving unit 114*x*, a report that a noise is sensed. Then, the access node 110 transmits said report to the controller 130*b*3 via the transmitting/receiving unit 114*z* and the wireless communication unit 140*bx*. Then, the controller 130*b*3 controls the field device 120*b*3 corresponding to a valve, for example, in response to the field device 120*a*1 sensing a noise.

In the step 320, the wireless communication unit 140 or the access node 110 judges whether the traffic is successfully transmitted. For example, the wireless communication unit 140 judges that the traffic is successfully transmitted if it receives an acknowledgement (ACK: ACKnowledgement) corresponding to said traffic from the access node 110, in response to an uplink transmission of the traffic to the access node 110. Similarly, the access node 110 judges that the traffic is successfully transmitted if it receives an ACK corresponding to said traffic from the wireless communication unit 140, in response to a downlink transmission of the traffic to the wireless communication unit 140. The wireless communication unit 140 or the access node 110 ends the processing if it judges that the traffic is successfully transmitted.

On the other hand, the wireless communication unit 140 judges that transmission of the traffic fails if it receives a negative acknowledgement (NACK: Negative ACKnowledgement) corresponding to said traffic from the access node 110, in response to an uplink transmission of the traffic to the access node 110, or if it does not receive an ACK. Similarly, the access node 110 judges that transmission of the traffic fails if it receives an NACK corresponding to said traffic from the wireless communication unit 140, in response to a downlink transmission of the traffic to the wireless communication unit 140, or if it does not receive an ACK.

In the step 330, the wireless communication unit 140 or the access node 110 judges whether the number of transmissions of the traffic exceeds the upper-limit number, if it judges transmission of the traffic fails. If it judges that the number of transmissions of the traffic does not exceed the upper-limit number, in the step 340, the wireless communication unit 140 or the access node 110 retransmits the traffic and returns the processing to the step 320. It is noted that, here, the wireless communication unit 140 or the access node 110 may change the wireless communication path when the traffic is retransmitted. In addition, the wireless communication unit 140 or the access node 110 may also make the wireless communication path redundant depending on the number of retransmissions.

On the other hand, if it judges that the number of transmissions of the traffic exceeds the upper-limit number, the wireless communication unit 140 or the access node 110 notifies the controller 130 or the application server corresponding to the communication source of failure in transmission of the traffic. Then, in the step 350, the controller 130 or the application server corresponding to the communication source judges whether the traffic is required to have a real-time property. If it judges that the traffic is required to have a real-time property, in the step 360, the controller 130 or the application server corresponding to the communication source discards the traffic and ends the processing.

On the other hand, if it judges that the traffic is not required to have a real-time property, in the step 370, the controller 130 or the application server corresponding to the communication source stores the traffic in an internal memory or other and ends the processing.

In this manner, each controller 130 may store said traffic, if it receives a notification of failure in transmission of the traffic from the wireless communication unit 140. Similarly, if the application server receives notification of failure in transmission of the traffic from the access node 110, it may store said traffic. Here, each controller 130 and the application server may discard from said traffic, a traffic required to have a real-time property. This allows the plant system 10 to obtain data after failure in the wireless communication occurred. Here, the plant system 10 discards data which is useless unless it is obtained in real time, so as to reduce a burden on an internal memory or other for storing data if the wireless communication fails.

Conventionally, if a number of controllers are connected via a wired connection so as to establish a redundant network, it requires a number of switches such as an access switch dedicated to the controller, a gateway switch for providing a connection to the higher level system, and an aggregation switch for collecting lines therebetween, for example. In addition to an increase in number of switches required to be introduced, it also requires a complicated cabling and a complicated setting of network devices such as setting of paths. Therefore, it requires a substantially large cost to establish such a large scale network via a wired connection. Furthermore, it requires a large cost to change the network configuration if a device is added. However, in the plant system 10 according to the present embodiment, the plurality of controllers 130 and the access node 110 connected to the network 100 are connected via a wireless connection such that the plurality of controllers 130 can communicate with the network 100. This allows the plant system 10 according to the present embodiment to establish a network in a simplified manner such that the plurality of controllers 130 can communicate with the higher level system. In addition, in the plant system 10 according to the present embodiment, the wireless communication path between the wireless communication unit 140 and the access node 110 is made redundant so that, even if one wireless communication path is blocked constantly or temporarily, another wireless communication path can perform a communication. This can provide a highly reliable system. In addition, in the plant system 10 according to the present embodiment, the same traffic can be transmitted/received by use of a plurality of wireless communication paths so as to obtain a diversity effect. In addition, in the plant system 10 according to the present embodiment, QoS control is performed in accordance with a communication requirement such that a huge variety of traffics can be transmitted so as to meet required conditions. In addition, in the plant system 10 according to the present embodiment, one wireless communication unit 140 is not provided for one controller 130. That is, the number of the wireless communication units 140 is smaller than the number of the controllers 130 in the group. This allows the plant system 10 according to the present embodiment to reduce mutual interference among the wireless communication units 140, compared to the case where one wireless communication unit 140 is provided for one controller 130.

Figure 4:
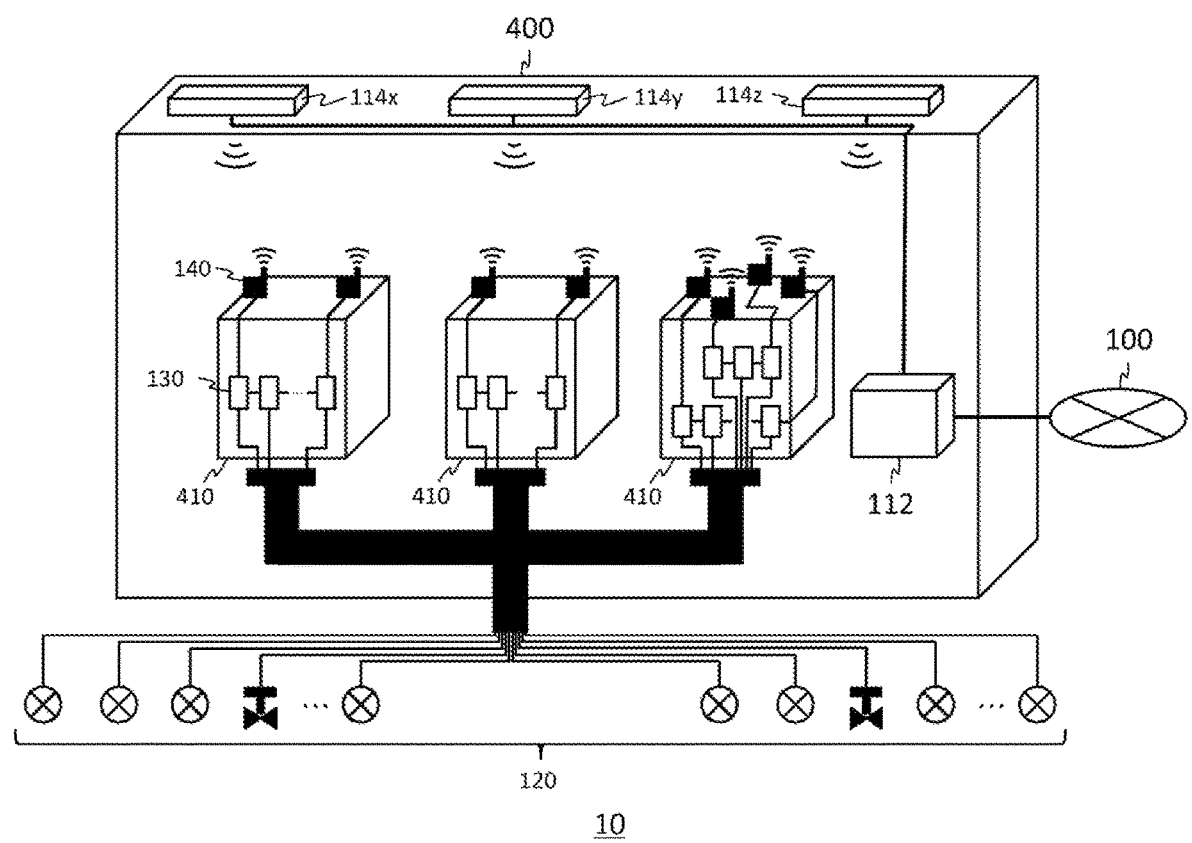
FIG. 4 illustrates the plant system 10 according to another variation example of the present embodiment.

FIG. 4 illustrates the plant system 10 according to another variation example of the present embodiment. In the present figure, components having the same function and configuration as in FIG. 1 are given the same reference numerals, and the following describes only differing points. In the plant system 10 according to the modified example, the plurality of controllers 130 are provided in an instrument room 400 in a centralized manner. In the plant system 10 according to such a modified example, the controller 130 may be a small sized device such as a single board computer, for example. Then, such controllers 130 may be densely integrated in a rack 410 and the wireless communication unit 140 may be provided for each rack 410. In this case, the plurality of transmitting/receiving units 114 may be provided at a location having a good line of sight, such as a ceiling in the instrument room 400. In addition, the wireless communication unit 140 may be provided at a location having a good line of sight, such as an upper portion of the rack 410. In addition, the controller 130 and the wireless communication unit 140 may be cabled mutually in the rack 410. In addition, if a large number of the controllers 130 are integrated in the rack 410, a plurality of (a plurality of sets of) wireless communication units 140 may be provided in said rack 410. The plant system 10 according to the modified example manages the plurality of controllers 130 integrally in the instrument room 400 so as to reduce a running cost of the system. In addition, according to the plant system 10 according to the modified example, the plurality of controllers 130 are densely integrated in the rack 410 so that the plurality of controllers 130 and the wireless communication unit 140 can be efficiently cabled in the rack 410.

A variety of embodiments of the present invention may be described with reference to flowcharts and block diagrams, where the blocks may represent: (1) steps of processes in which operations are performed; or (2) sections of devices responsible for performing the operations. Certain steps and sections may be implemented by dedicated circuitry, programmable circuitry supplied together with computer readable instructions stored on the computer readable medium, and/or a processor supplied together with computer readable instructions stored on the computer readable medium. Dedicated circuitry may include digital and/or analog hardware circuits and may include integrated circuits (IC) and/or discrete circuits. Programmable circuitry may include reconfigurable hardware circuits comprising, for example, logical AND, logical OR, logical XOR, logical NAND, logical NOR, and other logical operations, and memory elements such as flip-flops, registers, field-programmable gate arrays (FPGA), programmable logic arrays (PLA) or other.

Computer readable medium may include any tangible device that can store instructions for execution by a suitable device, such that the computer readable medium having instructions stored thereon comprises a product including instructions which can be executed to create means for performing operations specified in the flowcharts or block diagrams. Examples of computer readable medium may include an electronic storage medium, a magnetic storage medium, an optical storage medium, an electromagnetic storage medium, a semiconductor storage medium, or other. More specific examples of computer readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, or other.

Computer readable instructions may include any of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk, JAVA (registered trademark), C++, or other, and conventional procedural programming languages, such as the "C" programming language or similar programming languages.

Computer readable instructions may be provided to a processor of a general purpose computer, an application specific computer, or other programmable data processing device, or to programmable circuitry, locally or via a local area network (LAN), wide area network (WAN) such as the Internet or other, to execute the computer readable instructions to create means for performing operations specified in the flowcharts or block diagrams. Examples of processors include computer processors, processing units, microprocessors, digital signal processors, controllers, microcontrollers, or other.

Figure 5:
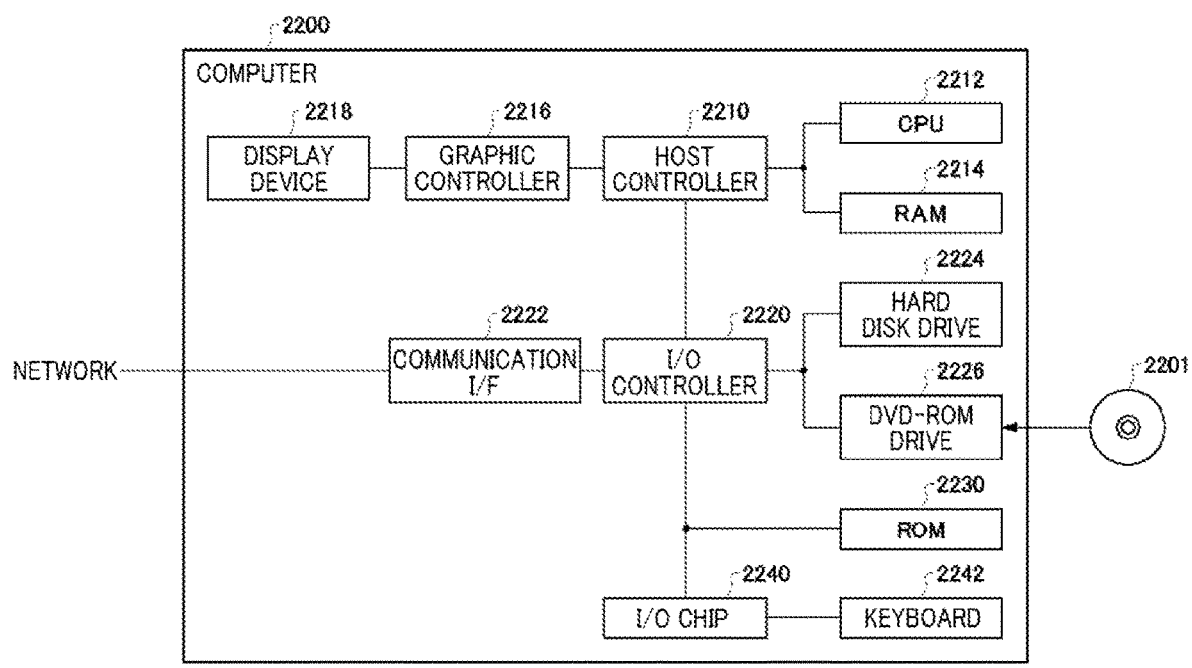
FIG. 5 illustrates an example computer 2200 in which a plurality of aspects of the present invention may be embodied entirely or in part.

FIG. 5 illustrates an example computer 2200 in which a plurality of aspects of the present invention may be embodied entirely or in part. A program that is installed in the computer 2200 can cause the computer 2200 to function as or perform operations associated with the device according to the embodiments of the present invention or one or more sections of said device, or perform said operations or said one or more sections, and/or cause the computer 2200 to perform the processes according to the embodiments of the present invention or steps of said processes. Such a program may be executed by the CPU 2212 to cause the computer 2200 to perform certain operations associated with some or all of the blocks of flowcharts and block diagrams described herein.

The computer 2200 according to the present embodiment includes a CPU 2212, an RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as an ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 obtains image data generated by the CPU 2212 on a frame buffer or other provided in the RAM 2214 or in itself, and causes the image data to be displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or other to be executed by the computer 2200 when activated, and/or a program which depends on the hardware of the computer 2200. The input/output chip 2240 may also connect a variety of input/output units to the input/output controller 2220, via a parallel port, a serial port, a keyboard port, a mouse port, or other.

A program is provided by computer readable medium such as the DVD-ROM 2201 or an IC card. The program is read from the computer readable medium, installed into the hard disk drive 2224, RAM 2214, or ROM 2230, which are also examples of computer readable media, and executed by the CPU 2212. The information processing described in these programs is read into the computer 2200, which results in cooperation between a program and a variety of types of hardware resources mentioned above. The device or the method may be configured by realizing the operation or processing of information in accordance with the use of the computer 2200.

For example, if a communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or other provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card or other, and perform a variety of types of processing on the data on the RAM 2214. The CPU 2212 may then write back the processed data to the external recording medium.

A variety of types of information, such as a variety of types of programs, data, tables, and databases, may be stored in the recording medium to undergo information processing. The CPU 2212 may perform a variety of types of processing on the data read from the RAM 2214, which includes a variety of types of operations, information processing, condition determination, conditional branch, unconditional branch, retrieval/replacement of information or other, as described anywhere throughout this disclosure and designated by an instruction sequence of programs, and writes the result back to the RAM 2214. In addition, the CPU 2212 may retrieve information in a file, a database or other, in a recording medium. For example, if a plurality of entries are stored in the recording medium, where each entry has an attribute value of a first attribute associated with an attribute value of a second attribute, the CPU 2212 may retrieve an entry which matches the condition having a designated attribute value of the first attribute, from among said plurality of entries, and read the attribute value of the second attribute stored in said entry, thereby obtaining the attribute value of the second attribute associated with the first attribute which meets the predetermined condition.

The program or software modules described above may be stored in the computer readable medium on the computer 2200 or in the vicinity of the computer 2200. In addition, a recording medium such as a hard disk or an RAM provided in a server system connected to a dedicated communication network or the Internet can be used as the computer readable medium, thereby providing the program to the computer 2200 via the network.

While the embodiments of the present invention have been described, the technical scope of the invention is not limited to the above described embodiments. It is apparent to persons skilled in the art that a variety of alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: plant system
100: network

110: access node
112: signal processing unit
114: transmitting/receiving unit
120: field device
130: controller
140: wireless communication unit
400: instrument room
410: rack
2200: computer
2201: DVD-ROM
2210: host controller
2212: CPU
2214: RAM
2216: graphic controller
2218: display device
2220: input/output controller
2222: communication interface
2224: hard disk drive
2226: DVD-ROM drive
2230: ROM
2240: input/output chip
2242: keyboard

What is claimed is:

1. A plant system comprising:
an access node including:
  a signal processing unit connected to a network; and
  a plurality of transmitting/receiving units connected to the signal processing unit and each provided at different locations in a plant, at least a part of a coverage area covered by each of the plurality of transmitting/receiving units being overlapped;
a plurality of controllers configured to perform distributed control on a plurality of field devices provided in the plant; and
a wireless communication unit provided in each group of a plurality of groups into which the plurality of controllers are grouped and connected to each controller in the corresponding group via a wired connection, and configured to connect each controller to the access node via a wireless connection, wherein
different transmitting/receiving units among the plurality of transmitting/receiving units communicate, via the same wireless communication unit, with the same controller among the plurality of controllers.

2. The plant system according to claim 1, wherein a plurality of the wireless communication units are provided in a group, and each controller is connected to the access node via a wireless connection via a plurality of the wireless communication units.

3. The plant system according to claim 2, wherein a plurality of the wireless communication units are provided at different locations in a group, respectively.

4. The plant system according to claim 1, wherein the access node is configured to perform QoS control in accordance with a requirement for communication with each controller.

5. The plant system according to claim 1, wherein each controller is configured to receive a notification of failure in transmission of the traffic from the wireless communication unit.

6. The plant system according to claim 5, wherein each controller is configured to discard from the traffic, a traffic required to have a real-time property.

7. The plant system according to claim 1, wherein at least one of the wireless communication unit and the access node is configured to aggregate redundant data reaching via a plurality of paths into one piece of data.

8. The plant system according to claim 1, wherein the wireless communication unit is configured to refer to a controller ID for identifying each controller in the corresponding group, and transmit a traffic to each controller based on the controller ID.

9. The plant system according to claim 1, wherein the access node is configured to refer to association between a controller ID for identifying each controller and a wireless communication unit ID for identifying the wireless communication unit used by each controller for a connection to the access node, and transmit a traffic to each controller, to the corresponding wireless communication unit based on the controller ID and the wireless communication unit ID.

10. The plant system according to claim 1, wherein the plurality of controllers are connected to the plurality of field devices such that each one of the plurality of controllers is connected to one of the plurality of field devices in a one-to-one relationship.

11. A method applied to:
an access node including:
  a signal processing unit connected to a network; and
  a plurality of transmitting/receiving units connected to the signal processing unit and each provided at different locations in a plant, at least a part of a coverage area covered by each of the plurality of transmitting/receiving units being overlapped;
a plurality of controllers configured to perform distributed control on a plurality of field devices provided in the plant; and
a wireless communication unit provided in each group of a plurality of groups into which the plurality of controllers are grouped and connected to each of the plurality of controllers in the corresponding group via a wired connection, wherein
the method comprises connecting each of the plurality of controllers to the access node via a wireless connection via a wireless communication unit, and
different transmitting/receiving units among the plurality of transmitting/receiving units communicate, via the same wireless communication unit, with the same controller among the plurality of controllers.

* * * * *